United States Patent
Levin et al.

(10) Patent No.: US 11,838,561 B2
(45) Date of Patent: Dec. 5, 2023

(54) SYSTEMS AND METHODS FOR PROGRAMMATIC QUALITY CONTROL OF CONTENT

(71) Applicant: NBCUniversal Media, LLC, New York, NY (US)

(72) Inventors: Michael S. Levin, Jersey City, NJ (US); Alexandra Paige, New York, NY (US); Tatiana Stepanov, Fair Lawn, NJ (US); Christopher Lynn, Brooklyn, NY (US); Dana Cacciatore, Ringwood, NJ (US); Carlos Costa, Centennial, CO (US); Rebecca Mason, Merrick, NY (US); Janice Navea, New York, NY (US); Joshua Butler, Clearwater, FL (US); Stephane Krzywoglowy, New York, NY (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 17/477,000

(22) Filed: Sep. 16, 2021

(65) Prior Publication Data

US 2023/0078516 A1    Mar. 16, 2023

(51) Int. Cl.
*H04N 21/234* (2011.01)
*H04N 21/24* (2011.01)
(Continued)

(52) U.S. Cl.
CPC ... *H04N 21/23418* (2013.01); *H04N 21/2402* (2013.01); *H04N 21/4431* (2013.01); *H04N 21/812* (2013.01)

(58) Field of Classification Search
CPC ......... H04N 21/23418; H04N 21/2402; H04N 21/4431; H04N 21/812
See application file for complete search history.

(56) References Cited

U.S. PATENT DOCUMENTS 9,872,074 B1 *  1/2018  Eliseo ................. H04N 21/812
9,973,830 B1 *  5/2018  Shetty ................. H04N 21/812
(Continued)

FOREIGN PATENT DOCUMENTS

WO    2012075347 A1    6/2012

OTHER PUBLICATIONS

Extended European Search Report for EP Application 22193162.9; dated Feb. 6, 2023; 9 pages.

*Primary Examiner* — Timothy R Newlin
(74) *Attorney, Agent, or Firm* — Fletcher Yoder, P.C.

(57) ABSTRACT

Systems and methods for controlling quality of content are provided. Programmatic ad buying may facilitate and expedite ad buying via an automated process. However, quality control via a conventional ad buying process is done with manual intervention. A confidence tool may request, from a programmatic content library of a content provider, to analyze a content tag associated with programmatic content. The confidence tool may determine whether the content tag meets confidence criteria (e.g., specifications of a content presentation service). The confidence tool may notify the content provider of whether the content tag meets the confidence criteria. Based on this notification, the content provider may approve the content to be run or reject the content to prevent problematic content from running on the content presentation service.

21 Claims, 10 Drawing Sheets

(51) Int. Cl.
  *H04N 21/443* (2011.01)
  *H04N 21/81* (2011.01)

(56) References Cited

U.S. PATENT DOCUMENTS

| | | | |
|---|---|---|---|
| 10,694,226 B1* | 6/2020 | Demsey | G06Q 30/0275 |
| 10,924,778 B1* | 2/2021 | Shivapurkar | H04N 21/26258 |
| 2002/0144262 A1* | 10/2002 | Plotnick | H04N 21/4314 |
| | | | 348/E7.071 |
| 2004/0093253 A1* | 5/2004 | Iijima | H04N 21/812 |
| | | | 348/E7.063 |
| 2006/0015904 A1* | 1/2006 | Marcus | H04N 7/16 |
| | | | 348/E7.071 |
| 2008/0195664 A1* | 8/2008 | Maharajh | G06Q 30/0244 |
| 2012/0023131 A1* | 1/2012 | Downey | H04N 21/812 |
| | | | 707/769 |
| 2012/0069131 A1* | 3/2012 | Abelow | G06Q 30/0601 |
| | | | 345/589 |
| 2013/0268963 A1* | 10/2013 | Nugent | H04N 21/812 |
| | | | 725/32 |
| 2015/0128157 A1* | 5/2015 | Hardie | H04N 21/4126 |
| | | | 725/5 |
| 2015/0358658 A1* | 12/2015 | Murphy | H04N 21/854 |
| | | | 725/35 |
| 2016/0295299 A1* | 10/2016 | Kang | H04N 21/458 |
| 2017/0098252 A1* | 4/2017 | Box | H04N 21/25435 |
| 2017/0169855 A1* | 6/2017 | D'Autremont | H04N 21/85406 |
| 2019/0188095 A1* | 6/2019 | Shen | G06F 11/2033 |
| 2019/0287138 A1 | 9/2019 | Buchalter et al. | |
| 2020/0221186 A1* | 7/2020 | Shambro, Jr. | H04N 21/64707 |
| 2021/0014549 A1* | 1/2021 | Church | H04H 60/40 |
| 2021/0314671 A1* | 10/2021 | Shambro, Jr. | H04N 21/64707 |
| 2022/0021911 A1* | 1/2022 | Wang | G06Q 10/06312 |

* cited by examiner

SYSTEMS AND METHODS FOR PROGRAMMATIC QUALITY CONTROL OF CONTENT

BACKGROUND

The present disclosure generally relates to content provision. More particularly, the present disclosure relates to systems and methods for controlling quality of content in a programmatic ad buying environment.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described herein relate to automated quality control (QC) of content that may be edited without notice by third-parties. The QC process ensures that the content satisfies quality requirements of one or more presentation services that will present the content to content consumers. The QC process may automatically generate work orders useful for identifying the content that should undergo the QC process. In this manner, programmatic content that is ordered on-the-fly may undergo the QC process despite a lack of user-specified work-order that specifies the content.

In one embodiment a tangible, non-transitory, computer-readable medium, comprising computer-readable instructions is provided. When executed by one or more processors of an electronic device, the computer-readable instruction may cause the electronic device to identify programmatic content stored in a programmatic content library, wherein the programmatic content includes content that is scheduled, at a content provider service, via an automated scheduling process, for presentation via a content presentation service. In response to identifying the programmatic content, the electronic device may perform quality control of the programmatic content by: receiving a content tag, indicative of the programmatic content, wherein the content tag comprises a link to the programmatic content; identify criteria associated with the content presentation service; determine whether the content tag, the programmatic content, or both, meet the criteria by analyzing the content tag, the programmatic content, or both. In response to determining that the content tag, the programmatic content, or both meets the criteria, causing the content provider service to run the programmatic content; and, in response to determining that the content tag, the programmatic content, or both does not meet the criteria, causing the content provider service to refrain from running the programmatic content.

Another embodiment may include a method including identifying programmatic content stored in a programmatic content library, wherein the programmatic content comprises content that is scheduled, at a content provider service, via an automated scheduling process, for presentation via a content presentation service. In response to identifying the programmatic content, performing quality control of the programmatic content by receiving a content tag indicative of the programmatic content, wherein the content tag includes a link to the programmatic content; identifying criteria associated with the content presentation service; determining whether the content tag, the programmatic content, or both meet the criteria by analyzing the content tag. In response to determining that the content tag, the programmatic content, or both meet the criteria, causing the content provider service to run the programmatic content; and, in response to determining that the content tag, the programmatic content, or both do not meet the criteria, causing the content provider service to refrain from running the programmatic content.

DRAWINGS

These and other features, aspects, and advantages of the present disclosure will become better understood when the following detailed description is read with reference to the accompanying drawings in which like characters represent like parts throughout the drawings, wherein:

FIG. 5 is a schematic drawing of an XML file including a wrapped tag, in accordance with an embodiment of the present disclosure;

FIG. 6A is a schematic drawing of a portion of an XML file that includes an inline tag, in accordance with an embodiment of the present disclosure;

FIG. 6B is a schematic drawing of a portion of the XML file of FIG. 6A that includes XML media files that may be part of the content bought and/or provisioned in FIG. 1, in accordance with an embodiment of the present disclosure;

DETAILED DESCRIPTION

Figure 1:
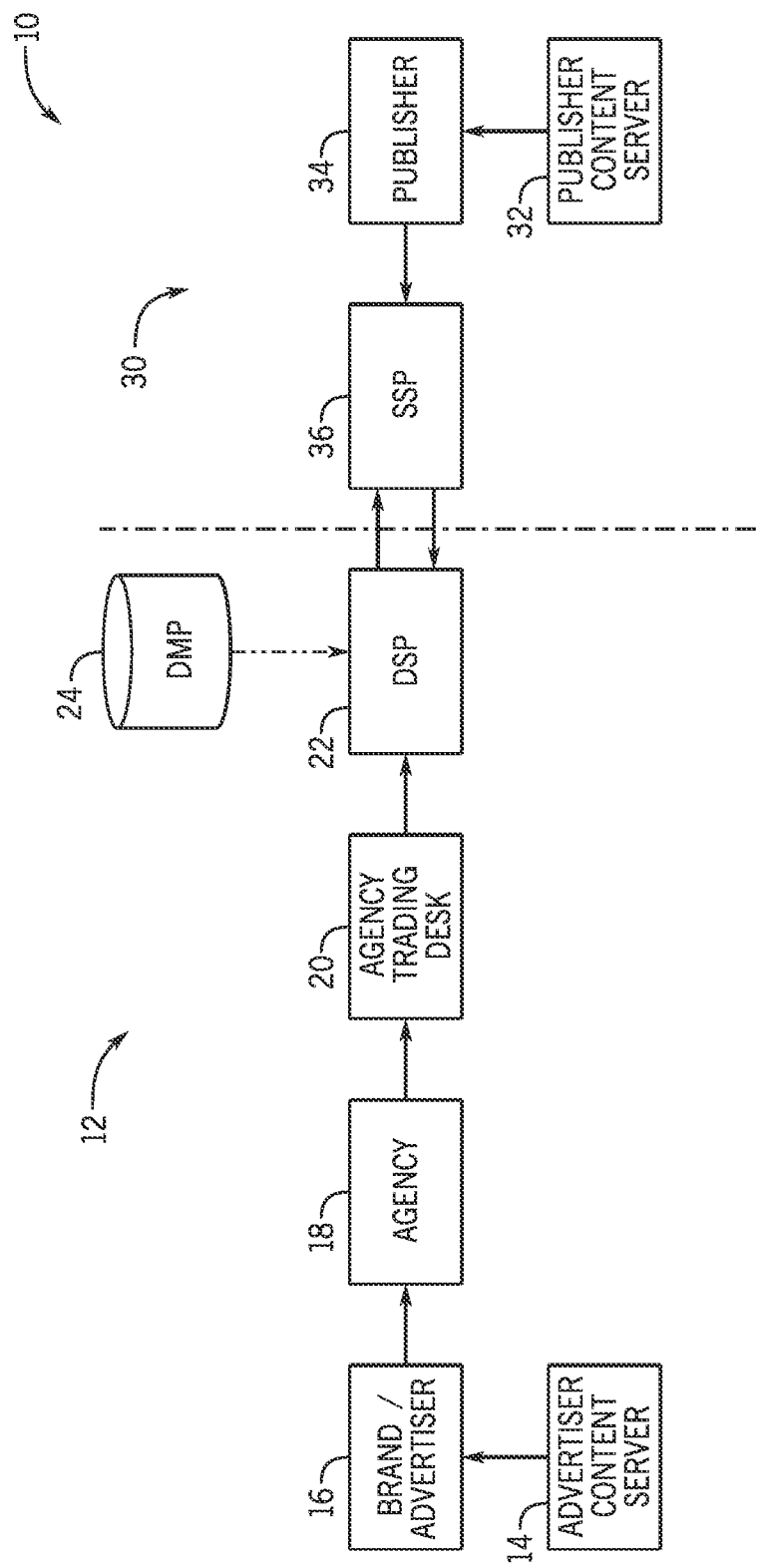
FIG. 1 is a diagram illustrating a programmatic content buying and provisioning system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

As discussed in greater detail below, the present embodiments described herein facilitate and improve the monitoring of a quality of content (e.g., advertisements, commercial notices, marketing content, or another suitable secondary media content) in a programmatic ad buying and provisioning environment. Content may also be referred to as a creative. Ad buying may be accomplished by several methods, including manual bidding (e.g., bidding at an open auction), direct buys (e.g., wherein an ad buyer may negotiate ad rate, run time, and so on with a publisher), or programmatic buys (artificial intelligence (AI) and algorithm-enabled real-time bidding on ad space that matches a consumer profile). Programmatic content may refer to content with placements that are bought and sold between an ad buyer (e.g., an advertiser or brand) and an ad seller on-the-fly (e.g., in near-real-time) via a programmatic interface that automates the buying and selling process. In conventional, non-programmatic, ad buying environments (e.g., direct sold), before content is displayed via content presentation services or content servers, the content undergoes a certain manual quality control process to ensure that quality requirements are met. For example, to perform a quality control check on content, the content may be directed to a particular internal group (e.g., a sales operation team) that may manually process the content via a quality control workflow (e.g., by manually generating work orders for the quality control workflow). However, such a quality control processes may not be available in programmatic ad buying and provisioning environments, as a deal for buying advertisements may, because of the programmatic interface, be automatically (e.g., algorithmically) executed without intervention from a publisher. For instance, ad space may be bought and sold, and content may be run on a publisher's content presentation service (e.g., Peacock) without the publisher ever having obtained access to the programmatic content beforehand in order to run a quality control check. Additionally, even if quality control is available for programmatic content, after the programmatic content is deemed to have passed a quality control inspection, third-party servers (e.g., third-party advertisers, third-party vendors) may modify or add to a content file (e.g., video ad serving template (VAST)). A content file may contain one or multiple pieces of content and may include information about the content regarding frame rate, bit rate, pixel size, duration, resolution, and so forth. Each content file may be associated with a content tag (e.g., VAST tag).

The quality control (QC) process implemented by a programmatic QC system may include pinging (e.g., submitting a query to another device on a network to determine whether there is a connection) a content provider via an application program interface (API) to request programmatic content. Content may include advertisements, commercial notices, marketing content, or another suitable secondary media content. As used herein, the term API may be defined as a communication protocol between a client and a server or in other words an interface implemented by an application, which allows other application to communicate with it. An API may include a set of functions, methods, classes, or protocols that an operating system, library, or service provides to support requests made by computer programs. The programmatic QC process may filter the programmatic content by a deal identifier (deal ID) that may indicate a deal type (e.g., programmatic guaranteed, programmatic direct, private marketplace (PMP) one-to-one, PMP one-to-many), and so on). After identifying the deal type, a work order instructing the programmatic QC system to perform QC on the programmatic content may be generated. In particular, the programmatic QC system may perform QC on a content tag (e.g., VAST tag) associated with the content. The content tag may include an inline tag, wherein the inline tag includes information (e.g., metadata) in the form of a URL link (e.g., nbcuniversal.com/content-tag.html). The information may include content name, content creation data, a unique content tag ID, and so on. Additional layers of information (e.g., software code) associated with the content tag that may be added by a third-party. These additional layers are herein referred to as wrapped tags, and the programmatic QC system may perform QC on the wrapped tags and unwrap them to access, and perform QC on, the inline tag and the content associated with the inline tag.

The programmatic QC system may automatically monitor (e.g., pulse) content for any changes by third-party servers and subsequently deactivate problematic content files in order to improve user experience in relation to viewing content and enhance revenue gains for a content provider. For example, a confidence tool may identify problematic changes to a content file and content tag via a pulsing mechanism, in which the content file and content tag are identified for deactivation until changes to the content file and content tag meet the specification of the content presentation services. Active (e.g., live) or in-flight (e.g., scheduled to be live) content files may continue being pulsed for any modifications unless they have been deactivated.

The pulsing mechanism is a component of the programmatic QC system associated with the confidence tool. This programmatic QC system includes interaction between a translator cloud (e.g., a user interface), a confidence tool cloud (e.g., decision-making component), the programmatic QC system, a spot checker tool, and a content provider server. The translator cloud may be a user interface that the content provider may interact with. Further, the translator cloud maintains a history of quality control associated with each content tag. To initiate the quality control process, the programmatic QC system may automatically generate a work order using metadata (e.g., tag URL, start date, advertiser, etc.) associated with the content tag received by the confidence tool from third-party services/servers. After the work order has been validated within the confidence tool cloud, the content tag is analyzed for quality via a quality control system and/or manually checked via a spot checker tool. In some embodiments, the content tag may be analyzed for quality via the programmatic QC system and manually checked via the spot check. In other embodiments, the content tag may be analyzed for quality via the programmatic QC system without being manually checked via the spot check. The quality control (QC) results (e.g., QC fail, QC pass) associated with the content tag are determined by the translator cloud.

Upon performing the programmatic QC process, the programmatic QC system may push a QC status (e.g., pass/fail) to the content provider indicating whether the content is accepted or rejected by the QC system. The programmatic QC system may periodically check the content for changes and compliance, to ensure that no errors occur while deploying or running the content on the content presentation platform.

With the preceding in mind, the following figures relate to systems and processes for controlling quality of programmatic content and/or subsequently deactivating problematic programmatic content. Turning now to FIG. 1, a diagram of a high-level programmatic system 10 is illustrated. The programmatic system 10 may be a system for buying and/or provisioning advertising content placements, and may be represented by a demand side 12 and a supply side 30. The supply side 30 may include a publisher content server 32, a publisher 34, and a supply side platform (SSP) 36. The publisher content server 32 may supply content to the publisher 34 (e.g., NBCUniversal) for the publisher 34 to run on a content presentation platform (e.g., a website, a streaming app, and so on). A content server (e.g., 24, 14) may be used by the publisher 34, an advertiser (e.g., 16), an ad agency (e.g., 18), an ad network, and so on, to manage and/or run online ad campaigns (e.g., bundles of ad placements associated with one or more work orders). Content servers, such as an advertiser content server 14 and the publisher content server 32, may make instantaneous decisions about what ads to show on the content presentation platform.

On the demand side 12, the advertiser content server 14 may supply content to an advertiser (e.g., a brand) 16. The advertiser 16 may then send the content obtained from the advertiser content server 14 to an ad agency 18. The ad agency 18 may create, plan, and handle an advertising campaign and/or other forms of promotion and marketing for the client (e.g., the advertiser 16). The ad agency 18 may then hand the campaign off to an agency trading desk 20. The agency trading desk 20 may include an advertising group inside of a holding company or parent company that is responsible for executing programmatic strategy. The agency trading desk 20 may then coordinate with a demand side platform (DSP) 22 to execute the programmatic strategy. The DSP 22 may be a service used by digital ad buyers (e.g., the ad agency 18, the advertiser 16, and so on) to manage setup and delivery of the advertiser's ad campaign(s) programmatically, via an interface, while accessing inventory across multiple supply side platforms (SSPs) 36. The DSP 22 or the agency trading desk 20 may be responsible for setting up the content tags associated with the programmatic content. A data management platform (DMP) 24 may be a data warehouse software system that collects, sorts, and stores information and subsequently makes that information available in a format useful for an advertiser 16, a publisher 34, or any other related businesses. The information collected by the DMP 24 may be data obtained via tracking software (e.g., tracking pixels) that may enable a client (e.g., the advertiser 16) to categorize and sort user data to increase or maximize user engagement with an ad campaign.

Figure 2:
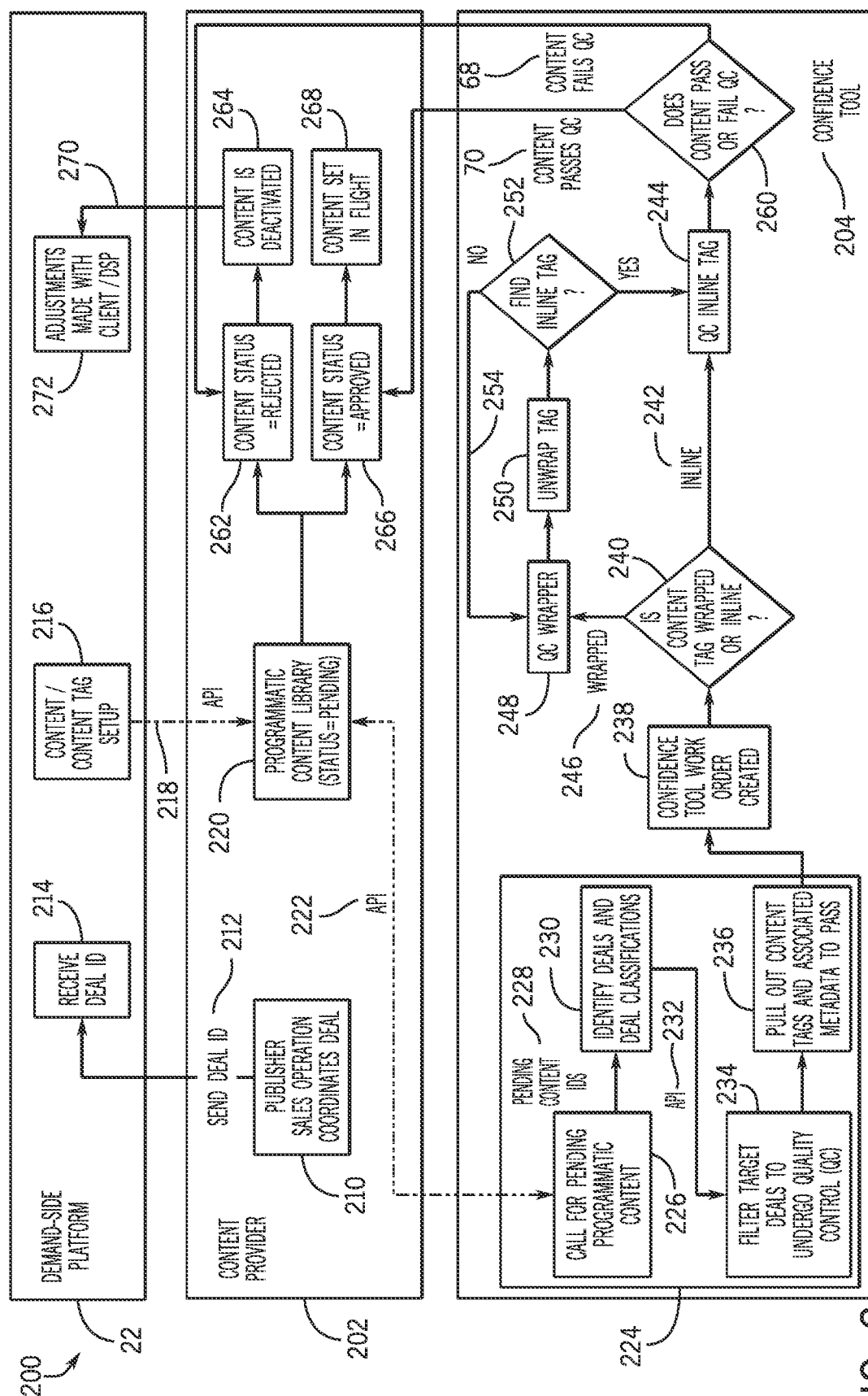
FIG. 2 is a diagram of a programmatic quality control system for performing quality control on content bought and sold in the programmatic ad buying system of FIG. 1, in accordance with an embodiment of the present disclosure.

FIG. 2 is a diagram of a programmatic quality control (QC) system 200. The programmatic QC system 200 may include the demand side platform (DSP) 22, a content provider 202, and a confidence tool 204. As previously discussed, the DSP 22 may be a service used by digital ad buyers (e.g., the ad agency 18, the advertiser 16) to manage the setup and delivery of an ad campaign in a single interface while accessing inventory across multiple SSPs. The DSP 22 may create content tags, help automate ad buying, and/or trigger an advertising auction, facilitate programmatic ad buying, or may facilitate another ad buying process. The content provider 202 may be a third-party digital video ad serving service provider (e.g., FreeWheel) that may schedule ads for provision by content presentation services 512 (shown below in FIG. 7). The content presentation services 512 may include, for example, Peacock. In the context of programmatic ad buying, the content provider 202 may host a service that facilitates these activities (e.g., an interface through which an advertiser may buy a publisher's advertising inventory). As previously stated, the confidence tool 204 may perform the actual quality control processes, and may also identify problematic changes to a content file and content tag via a pulsing mechanism, in which the content file and content tag are identified for deactivation (e.g., via the content provider 202) until changes to the content and content tag(s) are made and are found by the programmatic QC system 200 to meet the specification of the content presentation services.

The confidence tool 204 ensures that content, even after being modified by third-parties, meets the quality requirements of the content presentation services 512. The confidence tool 204 may receive content tags associated with content files from third-party servers (e.g., third-party servers 510 in FIG. 7). A content file may contain an indication of one or more pieces of content and may include information about the content regarding bit rate, pixel size, duration, resolution, and so forth. The content file is a data structure that may use an XML format to describe one or more pieces content to be displayed via a video player. A video player is an environment in which video content may be played. The programmatic QC system 200 may monitor the quality of content associated with each content tag received by the confidence tool 204.

Figure 3:
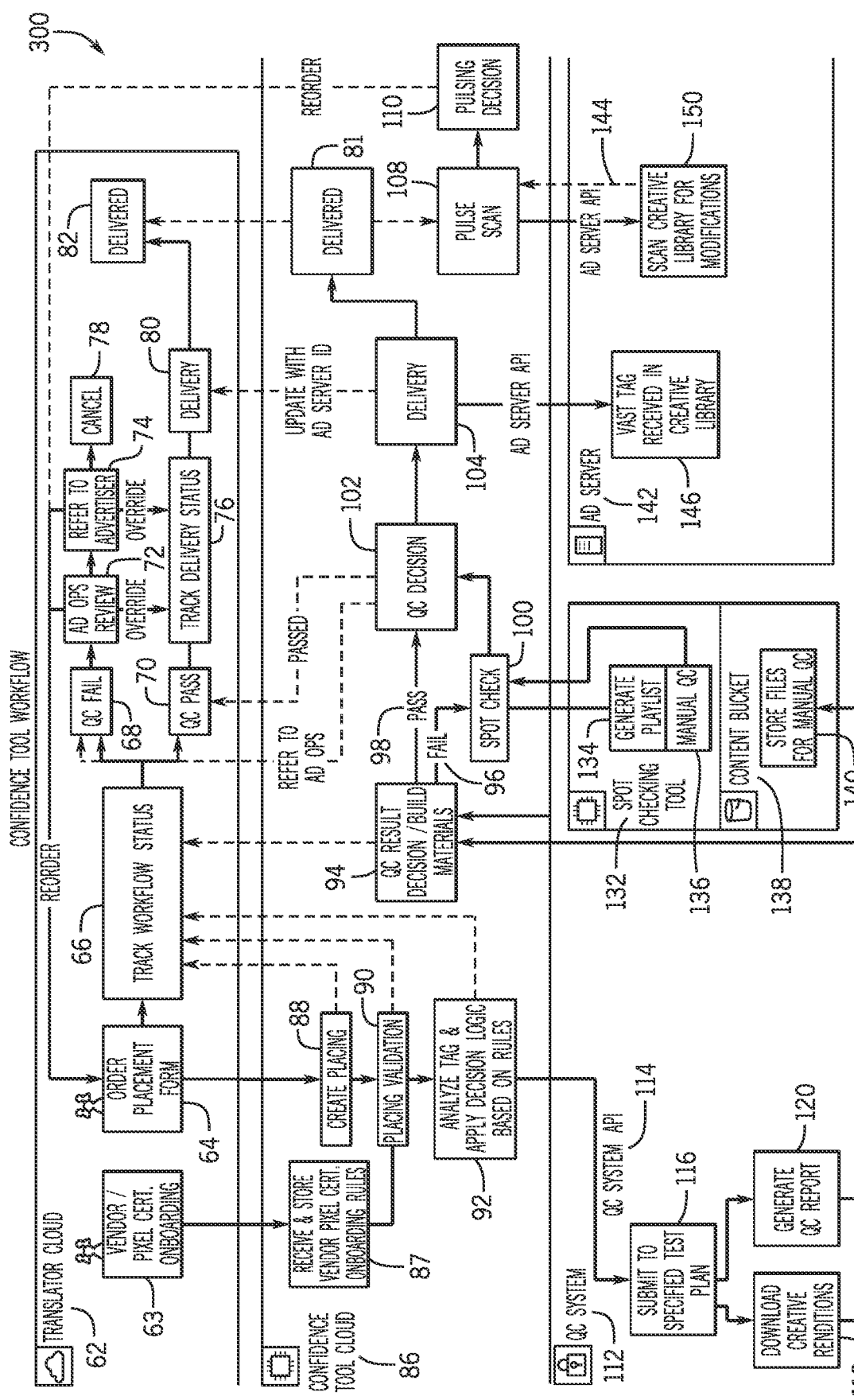
FIG. 3 is an illustration of a confidence tool quality control workflow associated with the confidence tool in the programmatic quality control system of FIG. 2, in accordance with an embodiment of the present disclosure.

With the preceding in mind, FIG. 3 illustrates the confidence tool quality control workflow 300 associated with the confidence tool 204. Non-limiting components of the confidence tool workflow 300 include the translator cloud 62, the confidence tool cloud 86, the QC system 112, the spot checking tool 132, and the content provider server 142. Confidence tool quality checking techniques are also described in U.S. application Ser. No. 16/951,752, filed Nov. 18, 2020, entitled "SYSTEMS AND METHODS FOR CONTROLLING QUALITY OF CONTENT," which is hereby incorporated by reference in its entirety for all purposes.

The translator cloud 62 may be an automated system or may serve as a user interface that the content provider (e.g., sales operation team) or a user may interact with. For example, a link or image that includes a tracking pixel may be selected automatically or by a user via the user interface (block 63). As used herein, a tracking pixel may be a computer-interpretable snippet of code that collects information about users on a website (e.g., how users browse and/or a type of ad that users click on). Vendor tracking pixels are tracking pixels that are associated with a particular domain (e.g., vendor.com) that identifies a vendor associated with the tracking pixel. The information stored based on the tracking pixel may be received and analyzed by the confidence tool cloud 86 (block 87). Information such as type of client or vendor used, and the like may be received by the confidence tool cloud 86. Further, the translator cloud maintains a history of work orders, QC results, and other QC checks associated with each content tag. As a result, the automated quality control workflow enables the sales operation team to review a work order history, QC results, and other QC checks associated with the content tag via the translator cloud near-real or real-time. In order to initiate the process of quality control for a content tag, the programmatic QC system 200 may generate a work order using metadata (e.g., tag URL, start date, advertiser, etc.) associated with the received content tag via the order placement form 64. The order placement form 64 is submitted in the translator cloud 62 and is associated with an order data type. The order data type may be in the format of a string and may include input fields such as name and ID of advertiser, start and end time of content, name and ID of campaign, name of vendor, vertical (e.g., industry in which vendors offer goods and services), type of content file, and so forth. A campaign may be defined as a series of content for a particular theme or marketing platform. Based on the inputted information, a content URL or unique ID may be outputted due to the order data type. The content URL or unique ID may be used to analyze quality of respective content.

Returning to FIG. 2, in process 210, the content provider 202 may enable the sales operation team of the publisher to coordinate a deal with an advertiser to sell ad inventory. This deal may be executed programmatically. Execution of a programmatic ad deal may include a profile associated with a buyer (e.g., the advertiser 16). The profile may include advertisement attributes (e.g., run time of ad, ad rates), the programmatic algorithm (e.g., of the content provider 202) may match the profile of the buyer with available ad inventory of the seller (e.g., the publisher 34) to coordinate the deal. As indicated by arrow 212, the content provider 202 may push the deal identifier (ID) to the DSP 22. The deal identifier may indicate what type of deal (e.g., direct sold, programmatic guaranteed) is coordinated in the process 210. In process 214 the DSP 22 may receive the deal ID, and in process 216 the DSP 22 may create a content tag (e.g., VAST tag) for the content of the deal coordinated in process 210. Using an integration the DSP 22 has setup on the content provider 202, the DSP 22 may push, via an API (indicated by arrow 218) associated with the content provider 202, the programmatic content into a programmatic content library 220 of the content provider 202. In certain embodiments, the DSP 22 may not push the programmatic content to the programmatic content library 220. For example, the programmatic content may be pushed to the programmatic content library 220 via an automated bidding system depending on the specific deal type.

The confidence tool 204 may include an automated work order generation workflow 224 for generating work orders that may enable the confidence tool 204 to perform QC on the programmatic content obtained from the programmatic content library 220. In process 226, the work order generation workflow 224 may access the programmatic content library 220 via the API 222, requesting pending content (e.g., content that has not been approved or rejected by the confidence tool 204) with a deal ID that may indicate a desired deal type. For example, in process 226, the work order generation workflow 224 may access the programmatic content library 220 and request content with a deal ID that may indicate a programmatic guaranteed deal type. The work order generation workflow 224 may access the programmatic content library 220 as needed, or at regular intervals, such as continuously or on a periodic basis (every 1 second, every 1 hour, once a day, twice a day, or any suitable time period). Additionally or alternatively, the content provider 202 may identify which programmatic content requires QC (e.g., if the programmatic content has not undergone QC, or has previously undergone QC but has experienced some change since the QC process) and may send, to the confidence tool 204, an indication of the programmatic content in need of QC. The work order generation workflow 224 may scrape the metadata of the requested content for information relevant to a work order. Using the metadata, the work order generation workflow 224 may categorize the deals according to any number of relevant attributes such as the deal type, which vertical (e.g., industry in which vendors offer goods and services) to assign the deal to, geographical location in which the deal is executed (e.g., country/region in which an advertisement will run) and so on. The work order generation workflow 224 may, as indicated by arrow 228, send the pending deal IDs to process 230, where the content may be filtered for a desired attribute, such as a desired deal type (e.g., programmatic guaranteed).

The work order generation workflow 224 may identify particular deals of interest by accessing an API 232 of the content provider 202. In process 234, upon pinging the API 232, the work order generation workflow 224 may target deals with the desired attributes determined by the filtering process 230. For example, a publisher 34 may request content with a programmatic guaranteed deal type that will run in the United States, thus, via the filter process 230, only those deals meeting this criteria will be targeted (process 234). The work order generation workflow 224 may also enable the use of a time stamp filter. The time stamp filter may flag every instance in which a content tag has been altered. Thus, when the confidence tool 204 is checking the content tags, it may skip over the content tags with time stamps that indicate that the content has not been altered since the previous QC check. For example, the publisher 34 (e.g., NBCUniversal) may wish to filter the content obtained from the programmatic content library 220 for the content that is desired to run on a particular content presentation service (e.g., Peacock). In process 236, the work order generation workflow 224 may pull out the content tags and associated metadata to pass to the confidence tool 204 in order to perform quality control (QC) (e.g., via the confidence tool workflow 300 in FIG. 3). It should be noted that, while the work order generation workflow 224 is described as an automated process, it may also be operated manually (e.g., by a publisher's sales operation team).

Figure 4:
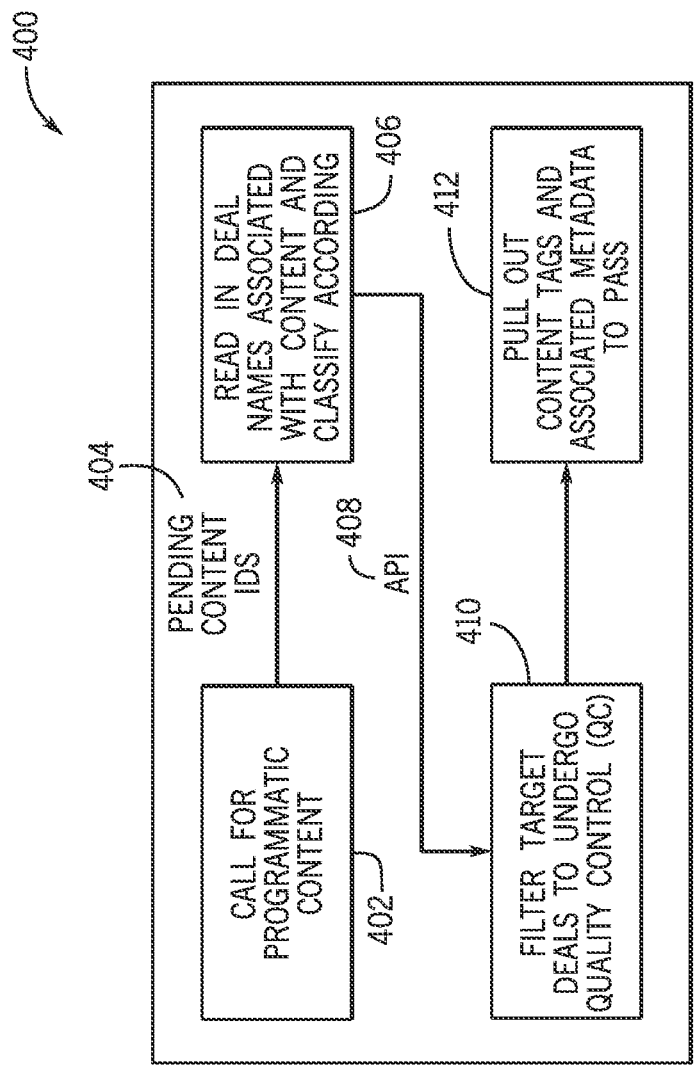
FIG. 4 is an automated work order generation workflow that may serve as an alternative embodiment of an automated work order generation workflow included in the programmatic quality control system of FIG. 2, in accordance with an embodiment of the present disclosure.

FIG. 4 is an automated work order generation workflow 400 for generating work orders that may enable the confidence tool 204 to perform QC on programmatic content (e.g., via the confidence tool workflow 300) independent of manual user entry of work order information, which may be particularly useful in a scenario where programmatic content is involved. The work order generation workflow 400 may be an additional and/or alternative embodiment of the work order generation workflow 224. Similarly to process 226 in FIG. 2, in process 402, the work order generation workflow 400 may access the programmatic content library 220 via the API 222, and request pending content (e.g., content that has not been approved or rejected by the confidence tool) with a deal ID that may indicate a desired deal type. For example, process 402 may ping the programmatic content library 220 and request content with a deal ID that may indicate a programmatic deal type. The work order generation workflow 400 may, as indicated by arrow 404, send the pending deal IDs to process 406, which may read in deal types associated with the content and may categorize the deals accordingly. The work order generation workflow 400 may then access another API (e.g., indicated by arrow 408) of the content provider 202. In process 410, upon accessing the API indicated by arrow 408, the work order generation workflow 400 may determine which deals meet the criteria to run on a particular platform (e.g., a particular content presentation service 512) as desired by the publisher. For example, the automated work order generation workflow 400 may target deals that meet the criteria to run on Peacock. Process 412 may operate similarly to process 236 in the work order generation workflow 224 of FIG. 2. In certain embodiments, the work order generation workflow 400 may be able to perform process 412 (e.g., pull out content tags and associated metadata to pass work order onto the QC process of the confidence tool 206) upon performing process 406 (e.g., reading in the deal names associated with the content) as reading in the deal names may enable the work order generation workflow 400 to obtain the content tags and associated metadata. Thus, the work order generation workflow 400 may skip the steps illustrated by arrow 408 and process 410. It should be noted that, similarly to the work order generation workflow 224 of FIG. 2, while the work order generation workflow 400 is described as an automated process, it may also be operated manually (e.g., by a publisher's sales operation team). The process for manually generating a work order is discussed in greater detail in U.S. application Ser. No. 16/951,752, filed Nov. 18, 2020, entitled "SYSTEMS AND METHODS FOR CONTROLLING QUALITY OF CONTENT," which is hereby incorporated by reference in its entirety for all purposes.

Referring back to FIG. 3, after the work order has been created in the translator cloud 62, a placing is created (block 88) in the confidence tool cloud 86, which controls QC results and decision-making with respect to the content tags. As described further, the confidence tool cloud 86 updates the user interface of the translator cloud 62 and communicates with a QC system 112, a spot checking tool 100, and/or a content provider server 142. Placing validation 90 may be performed to verify that the content tag is certified, can be properly parsed, and can be passed on to other steps of the programmatic QC system 200. If the placing is not valid or the content tag does not pass, a message indicating an error status may be displayed via the translator cloud 62. After the placing is determined to be valid, the content tag may be analyzed based on rules or testing parameters (process 92). The rules or the testing parameters may be configurable based on the type of content associated with the content tag. Content with a higher risk or higher sensitivity (e.g., child protected content) may have different parameters compared to content with lower risk or lower sensitivity (e.g., ad re-runs). In some embodiments, the parameters may be set by requirements or other criteria of the content provider 202 and/or an entity commissioning the content. Examples of such parameters include but are not limited to minimum bit rate, aspect ratio, resolution, frame rate, color space, and/or format specifications. In additional embodiments, the threshold requirements may be based on criteria set by operators of third-party servers (e.g., the DSP 22) who delivered the content tags and/or may be set to meet criteria of content presentation services. Flexibility in changing testing parameters for various types of content and content tags allows for a variety of content and content tags to be monitored for quality. Based on the rules or testing parameters, the QC system 112 may analyze the content tags received from third-party servers. The QC system 112 may be a third-party tool or may be a part of the confidence tool 204. Further, the QC system 112 may include an application program interface (API) (indicated by arrow 114) designed to automatically check the quality of content tag (e.g., an inline tag, a wrapped tag, or both) based on particular testing parameters.

As mentioned above, the confidence tool cloud 86 may also validate and/or analyze pixels wrapped within the content tag (e.g., VAST tag) or pixels associated with the content tag. Each content tag may correspond with at least one type of pixel. Non-limiting examples of types of pixels include vendor tracking pixels, fourth party tracking pixels, and third-party tracking pixels.

Vendor tracking pixels may be found in the tracking events within the XML of a content file (e.g., VAST) via quartile pixels, default impressions, click through events, mute or unmute features, and so forth. In some embodiments, click through events may be analyzed based on the ratio of users who click on a specific link and/or the number of users who view the content associated with the content tag. Vendor tracking pixels may be snippets of code that collect information about users on a vendor website (e.g., how users browse, type of ads users click on).

As used herein, fourth party tracking pixels may be vendor pixels wrapped in another vendor's content tag (e.g., VAST tag). For example, a content tag may correspond to a particular vendor, but tracking events associated with the content tag may correspond to another vendor. Third-party tracking pixels may include research and tracking pixels added as additional tracking pixels in the content tag. In particular, third-party tracking pixels may be located in an impression line or towards the bottom of the XML of the content file associated with the content tag in an extension type field. The confidence tool cloud 86 may determine whether pixels associated with the content tag are certified and/or recognized based on comparing the pixels with a list of registered or certified pixels and/or pixel whitelisting criteria. If a pixel is not certified or not recognized, the confidence tool cloud 86 may determine a QC fail for the content tag.

The QC system 112 may submit a test plan (process 116) that includes threshold requirements that may be set by requirements or other criteria of the content provider 202 or an entity commissioning the content. Examples of such requirements include but are not limited to minimum bit rate, aspect ratio, resolution, frame rate, color space, and format specifications. In some embodiments, the threshold requirements are based on third-party servers who sent the content tags or may be set to meet criteria of content presentation services. For example, threshold requirements may be set by modeling or simulation techniques based on analyzing a history or record of data collected from the content presentation services. The QC system 112 may download renditions of content (process 118) and generate a QC report (process 120) based on the test plan. Downloading renditions of content is an example of a job data type. The job data type may be in a format of a string, number, and/or object. Input fields of the job data type may include unique identifier for the job, type of job, priority of job, time of job creation, and so forth. Status and attributes from the job execution may be outputted based on the job data type. The downloaded renditions of content may be stored in a content bucket 138. The stored files of content may be used for manual QC as indicated by 140.

Returning again to FIG. 2, the information from the work order generation workflow 224 (or alternatively work order generation workflow 400 in FIG. 4) may be outputted to process 238, where the confidence tool work order may be automatically generated, thus enabling the confidence tool 204 to perform QC on the desired content obtained from the programmatic content library 220 and passed through the various filters in the work order generation workflow 224, even when no manually inputted work order has occurred. At decision block 240, the confidence tool 204 may analyze the content tags of the content included in the work order and determine whether the content tag is a wrapped tag or an inline tag. As used herein, the term inline tag may be defined as a tag that may directly identify (e.g., in the form of XML media files) the content (e.g., a video advertisement) that is to undergo QC via the confidence tool 204 (particularly the QC system 112 of the confidence tool workflow 300 in FIG. 3). Alternatively, the content tag may be a wrapped tag. As used herein, the term wrapped tag may be defined as a tag that contains one or more levels of third-party links that, when navigated to, will identify the content that is to undergo QC (e.g., these levels may occur when a third-party service is used to perform advanced tracking, advanced targeting, and so on). While the inline tag may enable the confidence tool 204 to perform QC on the content directly, each layer of the wrapped tag may be QC checked and unwrapped before the confidence tool 204 may reach the inline tag and perform QC on the content. As indicated by the arrow 246, when the confidence tool 204 determines that the content tag is a wrapped tag, process 248 performs QC on the wrapper via the QC system 112. As illustrated by process 250, the confidence tool may unwrap the wrapped tag by navigating to a third-party link in the tag and, as illustrated by decision block 252, the confidence tool 204 may determine whether unwrapping the wrapped tag leads to the inline tag or another wrapped tag. If another wrapped tag is found, the wrapped tag undergoes QC at process 248 and is unwrapped (process 250). The process 248 may include checking the domain of the pixel and checking to ensure that the version of the content tag is supported (e.g., VAST Version 2). Upon reaching an inline tag, the inline tag undergoes QC (process 244). The QC of the inline tag in the process 244 may be a more in-depth QC process than is performed on the wrapped tag. The process 244 will check the inline tag for particular attributes that describe the content, and may include performing QC on the pixel domain, content tag version, identifying an impression tracker, etc. The process 244 may also include performing QC on the programmatic content associated with the inline tag (e.g., checking the framerate, bitrate, audio quality, etc. of the XML file itself).

Figure 5:
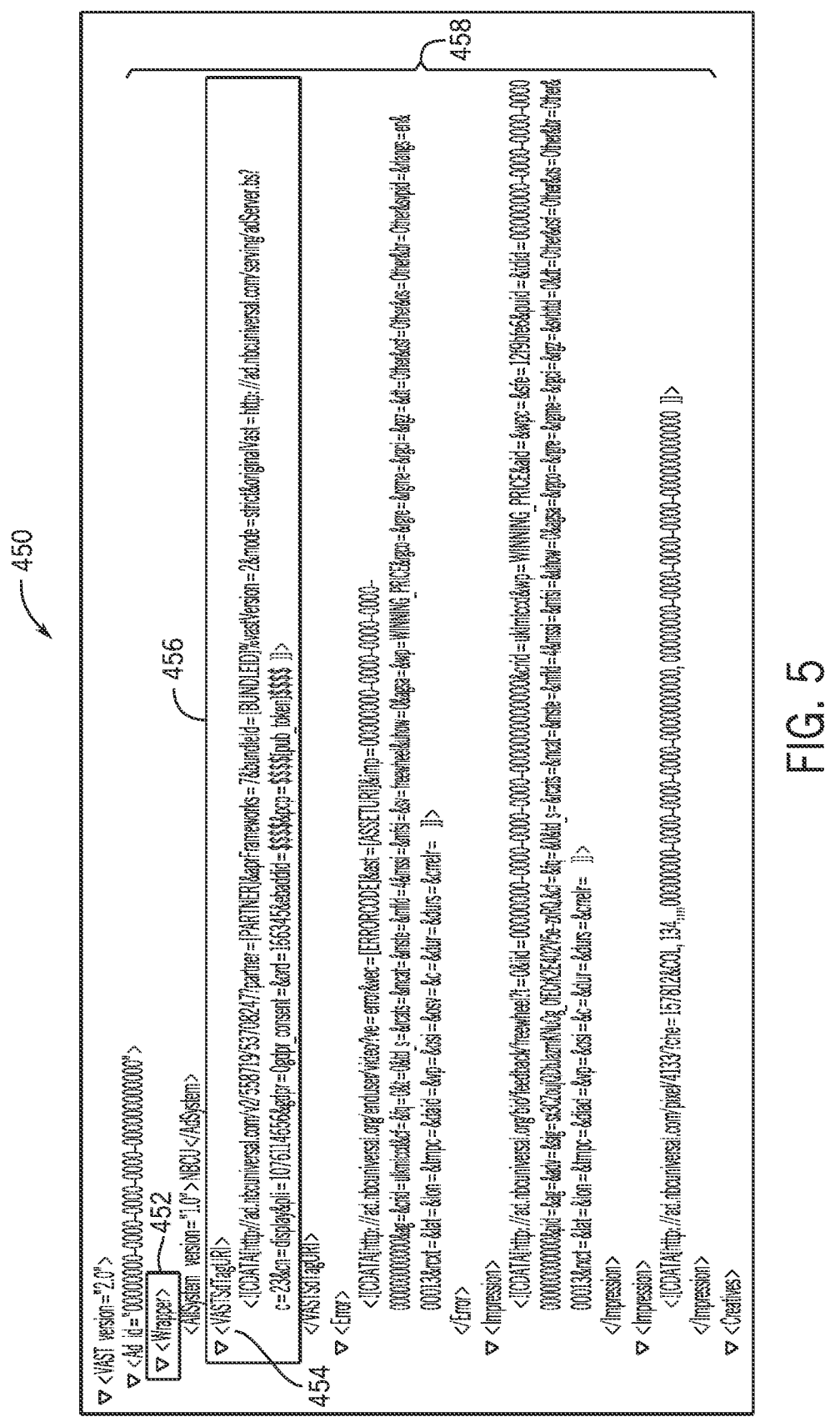
Figure 6A:
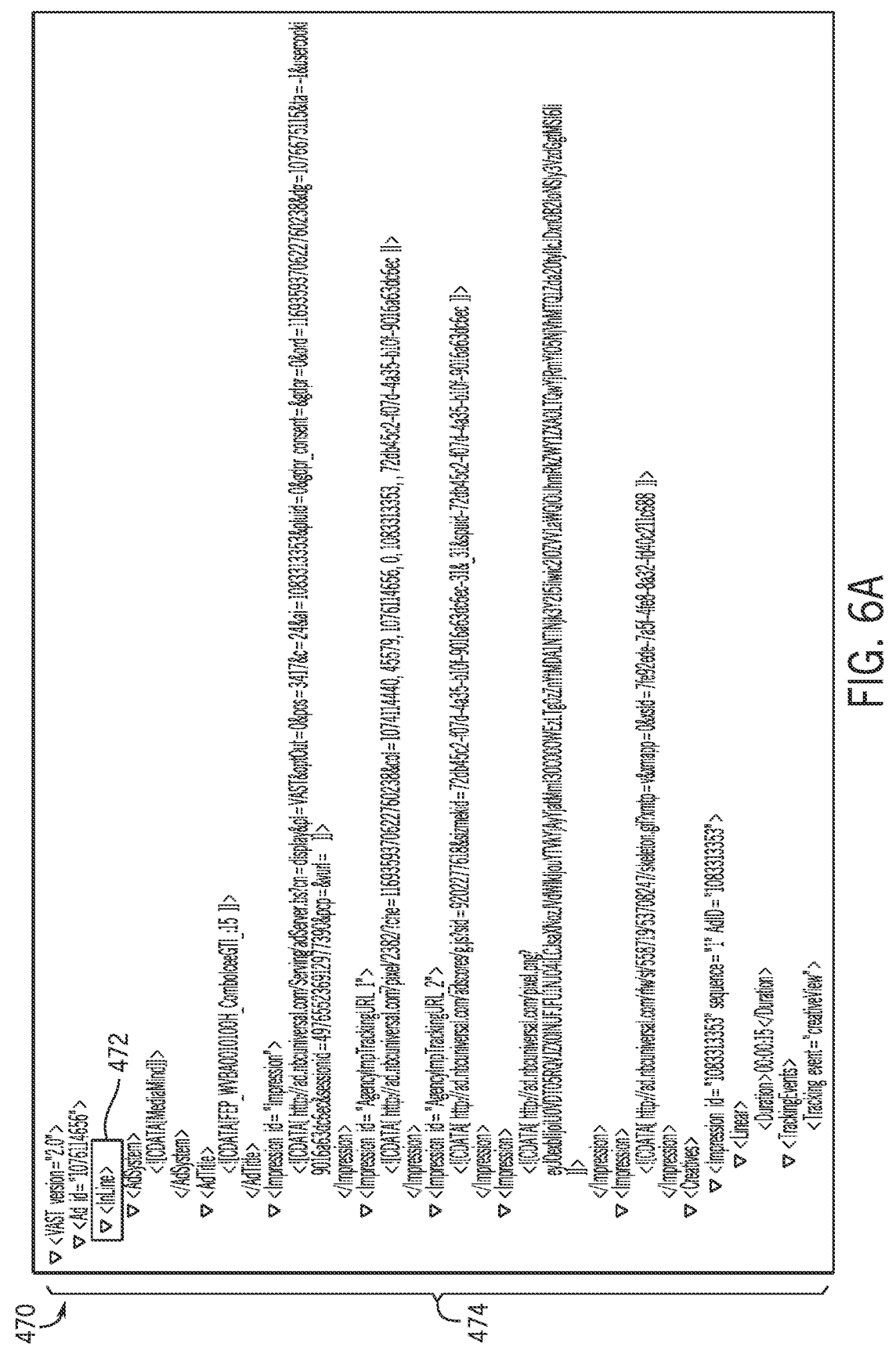
Figure 6B:
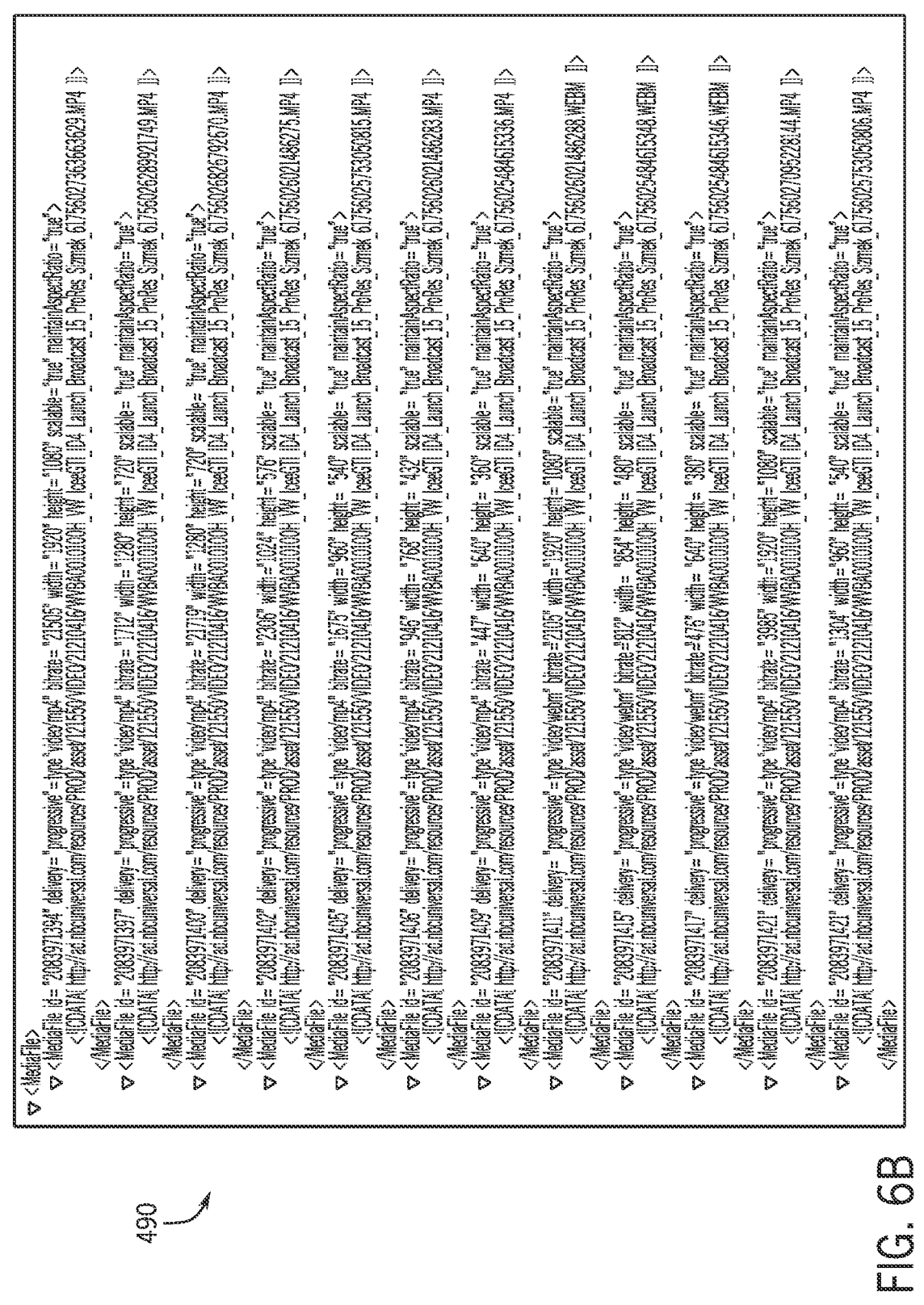
Figure 7:
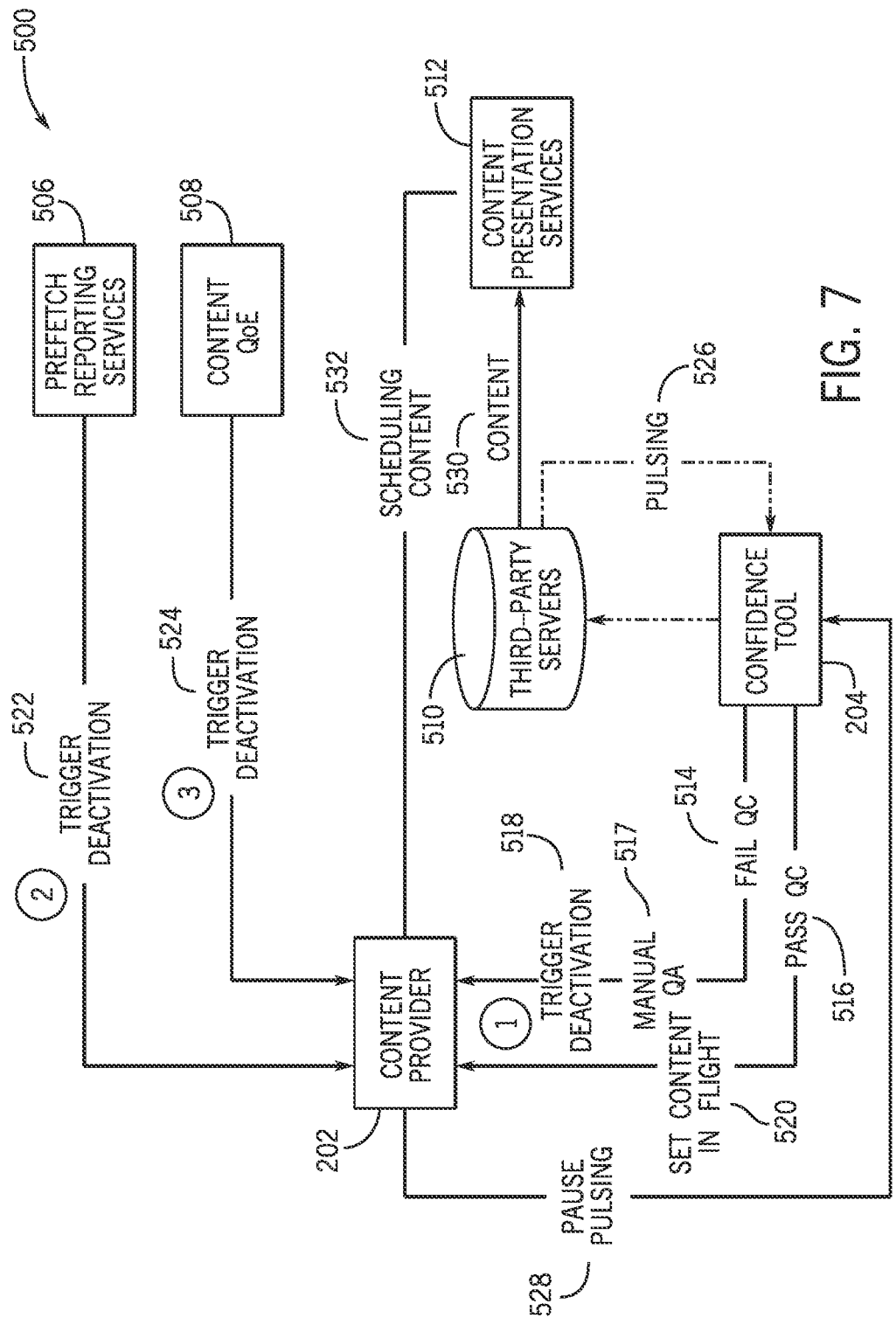
FIG. 7 is a schematic diagram of a content deactivation system for deactivating content that fails the programmatic quality control system of FIG. 2, in accordance with an embodiment of the present disclosure.

To expand on the concept of wrapped tags, FIGS. 5, 6, and 7 provide an example of "unwrapping" an example wrapped tag to find the inline tag. FIG. 5 is a schematic drawing that depicts a snippet of an XML file 450 that contains a wrapped tag 458. The confidence tool 204 may identify a wrapped tag 458 by observing a number of attributes of the XML file 450. One attribute may include an element (e.g., the wrapper indicator 452) that indicates that the content tag is wrapped. For example, the wrapper indicator 452 may include the words "wrapped" or "wrapper" to indicate the content tag is a wrapped tag. Another attribute may include a VAST ad tag URI 454 that may include a URL 456 (e.g., www.nbcuniversal.com/content-tag.html). The confidence tool 204 may "unwrap" the wrapped tag 458 (e.g., open and follow the URL 456) and determine that the URL leads to the inline tag or another wrapped tag 458 (e.g., as indicated by decision block 252 in FIG. 2). Briefly returning to FIG. 2, if the URL leads to a second wrapped tag, the confidence tool 204 may repeat the wrapped tag QC (e.g., as indicated by the arrow 254) on the second wrapped tag. In process 250, the confidence tool 204 may unwrap the second wrapped tag and determine if a URL associated with the second wrapped tag leads to an inline tag or yet another wrapped tag.

FIG. 6A is a schematic drawing that depicts an XML file 470 that includes an inline tag 474. The confidence tool 204 may determine that the content tag is an inline tag 474 by observing the inline indicator 472. For example, the inline tag indicator 472 may include the word "Inline" to indicate that the content tag is an inline tag. If, at decision block 252 of FIG. 2, the confidence tool 204 finds the inline tag 474 (e.g., after unwrapping the wrapped tag 458), the confidence tool 204 may perform QC on the inline tag 474 and the content associated with the inline tag 474 (process 244 in FIG. 2). As previously stated, the content associated with the inline tag 474 may include XML media files. FIG. 6B is a schematic drawing that depicts a portion the XML file 470 that includes XML media files 490 hosted by the inline tag 474. The XML media files 490 may together make up the content provided by the programmatic content library 220 of the content provider 202.

Returning to FIG. 2, at decision block 260, the confidence tool 204 may, once the inline tag has been reached, determine whether the content passes the QC check of the QC system 112 in FIG. 3. Referring back to the confidence tool workflow 300 of FIG. 3, content tags that meet quality criteria and threshold requirements set by the content provider 202, may pass the QC process as indicated by 94. As a result, the QC decision 102 may indicate a pass 98 for the content. Content tags that fail to meet quality criteria and threshold requirements set by the content provider 202 may fail the QC process as indicated by step 96. If the QC report (block 120) includes details that the confidence tool cloud 86 determines a QC fail (step 96) for a content tag, then the QC failed content tag may be checked again via a spot check 100. The spot check 100 includes the spot checking tool 132. The spot checking tool 132 generates a playlist of the failed content (block 134). Although the QC system 112 may be described as an automated system, in some embodiments a manual component may be implemented and, based on the playlist, the spot checking tool 132 may check the failed content tags via manual QC (block 136). Manual QC (block 136) is another example that uses a job data type. Again, the confidence tool cloud 86 determines a QC decision as to whether the previously failed content has failed again or passed. If the previously failed content has failed again, then the confident tool cloud 86 sets the QC decision to an overall fail for the previously failed content tag.

After the QC decision is complete, a message indicating a pass or fail is sent to the translator cloud 62. An indication of a QC fail is received (process 68) or a QC pass is received (process 70) and is displayed via the user interface of the translator cloud 62. In particular, the track workflow status (process 66) is updated in the user interface of the translator cloud 62 as content tags move along the QC process. The track workflow status (process 66) may be associated with the ad summary data type and the QC comments data type. The ad summary data type may be in the format of a string. Further the ad summary data type may specify the order, the content, the rendition, and status of QC results. Furthermore, the QC comments data type may be in the format of a string and/or object. The QC comments data type may specify description of comment, severity of QC warning, system at which comment is created, start time code, end time code, type of QC comment, vendor pixel data, and so forth.

After an indication of a QC fail is received (process 68) or a QC pass is received (process 70) and is displayed via the user interface of the translator cloud 62, the content tag may be delivered (e.g., to the content provider 202) or canceled by the content provider 202, as will be discussed in greater detail below. If there is an indication of a QC fail, the order (e.g., content tag) may be resubmitted to undergo the QC process again (block 72), referred to an advertiser (e.g., 16), which puts the order on hold until a decision is made (block 74), may be overridden to a QC pass, or may be canceled (process 78). In some embodiments, if the QC fail decision is overridden, the content tag may be delivered (process 80) for presentation of content associated with the content tag. The track delivery status 76 provides a status of the delivery of the content tag after it has been indicated as a QC pass. A QC pass or QC fail is determined based on comparing attributes of the content tag with quality criteria or testing parameters as discussed below. Before the QC results of the content tag are delivered (process 80), it undergoes a delivery process 104 in the confidence tool cloud 86. A content provider server 142 may add the content tag to its content library (block 146). As a result, the placing status is changed to "delivered" (block 81) in the confidence tool cloud 86. This delivered placing status (block 82) is sent to the translator cloud 62, which then displays the delivered status via the user interface.

Returning again to FIG. 2, if the content fails the QC process, the confidence tool 204 may transmit the QC fail indication 68 to the content provider 202. At process 262, the content provider 202 may update the status of the content from pending to rejected. At process 264, the content provider 202 may deactivate the problematic content. The deactivation process will be discussed in greater detail in FIG. 7 below. Once the content is deactivated, the content provider may transmit an indication (illustrated by arrow 270) that the content is deactivated to the DSP 22. In process 272, the DSP or client (e.g., advertiser 16) may make the adjustments necessary to enable the content to meet the confidence criteria and pass the QC check. However, if the content passes the QC process, the confidence tool 204 may transmit the QC pass indication 70 to the content provider 202. At process 266, the content provider 202 may update the status of the content from pending to approved. At process 268, the content provider 202 may set the content in flight (e.g., schedule the content to be run on the content presentation service 512). Once the content is approved and set in flight, the content may be periodically checked by the pulsing mechanism to determine if any changes have occurred and to re-run if changes are detected. The pulsing mechanism will be discussed in greater in FIG. 8 below.

In FIG. 7 a schematic diagram of an embodiment of a content deactivation system 500 is illustrated. The system 500 may include the confidence tool 204, a prefetch reporting service 506, a content quality of experience (QoE) 508, third-party servers 510, content presentation services 512, the content provider 202, and/or any combination thereof.

In one embodiment, the confidence tool 204 may receive content from third-party servers 510 (e.g., third-party advertisers, third-party vendors) that provide content to content presentation services 512. In some instances as indicated by arrow 530, the content provider 202 may have employed the third-party servers 510 to send content based on the needs and directions of the content provider 202 to the content presentation services 512. As indicated by arrow 532, the content provider 202 controls which content (e.g., one or more advertisements) is deployed and when the content is deployed to the content presentation services 512, or in other words regulates scheduling information (e.g., duration of content, tracking beacons associated with the content, media type associated with the content) provided to the content presentation services 512.

The third-party servers 510 may be associated with third-parties, such as creative or ad agencies (e.g., 18) that create marketing campaigns, ads, secondary video content, secondary audio content, and/or other content tailored to meet client needs. In some cases, the content received by the confidence tool 204 from the third-party servers 510 may not be live yet, or in other words has not been presented by content presentation services 512. The confidence tool 204 may serve as a quality control mechanism for such pre-live content (e.g., in flight content) as well as for content that is already live (e.g., active content). The confidence tool 204 performs pulsing 526, a mechanism that programmatically determines any changes made to receive content. Pulsing 526 may be performed on a continuous or periodic basis (every 1 second, every 1 hour, once a day, twice a day, or any suitable time period). The pulsing 526 operation may also be configured to be run on various schedules depending on attributes (e.g., advertiser, sales vertical) provided during work order creation in the translator cloud. The pulsing 526 operation may enable the confidence tool 204 to determine whether various attributes of the content abide by certain quality criteria (e.g., criteria of the content provider 202 and/or an entity commissioning the creation/editing of the content).

When the quality criteria are not met, the confidence tool 204 may provide an indication to the content provider 202, triggering deactivation of the content that does not meet the quality criteria (similarly to the QC fail result indication 68 of FIGS. 2 and 3). In process 514, the confidence tool 204 may transmit to the content provider 202 an indication that the programmatic content has failed QC. The problematic content may be deactivated by a first deactivation trigger 518 in response to the indication of failed QC. In some instances, problematic content that has failed QC may involve manual intervention 517. For instance, if problematic content may be susceptible to spikes in audio, a person may be assigned to listen to and investigate particular regions of the content for any spikes in audio. In process 516, the confidence tool 204 may transmit to the content provider 202 an indication that the programmatic content has passed QC. The indication of passed QC may trigger the content provider 202 to set the programmatic content to in flight (e.g., scheduled to be run on the content presentation service 512).

Along with the confidence tool 204, the prefetch reporting service 506 may enable the content provider 202 to deactivate problematic content. The prefetch reporting service 506 generates and/or updates a content playback report based on data issued by the content provider 202 on a periodic basis (e.g., daily or any suitable time period). For example, the content playback report may contain data associated with the previous 32 hours or any suitable time period of content playback. The content playback report may include information related to the number of requests associated with the content (e.g., the amount of content expected to play) and the number of refreshes associated with the content (e.g., the amount of content actually played). Based on the information within the content playback report, the prefetch reporting service 506 may cause the content provider 202 to deactivate the problematic content via a second deactivation trigger 522. For example, in some embodiments, if the ratio of an expected playback amount of a piece of content to the amount of actual playback of the piece of content exceeds a prescribed threshold, this may indicate that the piece of content should be deactivated, as there is a discrepancy between the expected and actual playback (e.g., which may be caused by refusal of playback by the content provider 202). The ratio can be inversed as well (amount of actual playback of content compared to the amount of expected playback of the content) in which case the content may be deactivated if the ratio is below a predetermined threshold.

In another embodiment, a third deactivation trigger 524 may cause the content provider 202 to deactivate the problematic content. The third deactivation trigger 524 may be generated by a content QoE 508. In some examples, the content QoE 508 may be referred to as video QoE. The statistics associated the content QoE 508 may help the content provider 202 identify the problematic content. The content statistics received by the content QoE 508 as well as by the prefetch reporting service 6 relate to content that has been live, or in other words has been presented by content presentation services 512. The features of the content deactivation system 500 described above may not be limited to those discussed herein but rather the confidence tool 204, the prefetch reporting service 506, and the content QoE 508 are non-limiting examples of systems that may be used for monitoring quality of content. The content provider 202 may deactivate the problematic content based on the trigger deactivations 518, 522, 524, and any combination thereof.

Once problematic content has been deactivated, it may be unnecessary to check the content for problems again until the problems with the content have been fixed (e.g., adjustments made by client/DSP as shown in process 272 of FIG. 2). In one embodiment, if the problematic content has been successfully deactivated, then the content provider 202 may request the confidence tool 204 to pause pulsing of the now deactivated problematic content as indicated by arrow 528. This may ensure that valuable computing resources are efficiently utilized for live and/or pre-flight content. Subsequently, prior to re-activation of the content (e.g., after fixing the problems with the content), the pulsing 526 may be re-activated.

As mentioned above, even after content that is deemed to have passed a quality control inspection, third-party servers (e.g., third-party advertisers, third-party vendors) may modify or add to a content file (e.g., VAST). A content file may contain one or multiple contents and may include information about the content regarding bit rate, pixel size, duration, resolution, and so forth. Each content file may be associated with a content tag (e.g., VAST tag). Therefore, active (e.g., live) and in-flight (e.g., scheduled to be live) content tags that are eligible may be pulsed (block 108) for any changes via the confidence tool 204 or the confidence tool cloud 86. The confidence tool cloud 86 performs pulsing to programmatically determine any changes made to the received content tags from third-party servers. Pulsing may be performed on a continuous or periodic basis (every 1 second, every 1 hour, once a day, twice a day or any suitable time period). After the confidence tool 204 communicates with the content provider server API 144 to confirm eligibility (e.g., active, in-flight) of the content tag, the confidence tool 204 may scan a content library for any changes to the content tag (block 150). If changes to the content tag are identified, the confidence tool 204 submits the content tag to the confidence tool workflow 60 again to be checked or monitored for quality. Based on determining whether various attributes of the content tag abides by certain quality criteria (e.g., criteria of the content provider server 142 and/or an entity commissioning the creation/editing of the content), the confidence tool cloud 86 makes a decision 110 to continue pulsing or deactivate the content tag. When attributes of the content tag do not meet quality criteria, the confidence tool cloud 86 may provide an indication to the content provider 202, triggering deactivation of the content tags that do not meet the quality criteria. In some embodiments, if the content tag passes the QC system 112 after being resubmitted, the work order may remain as is and may be pulsed again at a set time schedule.

Figure 8:
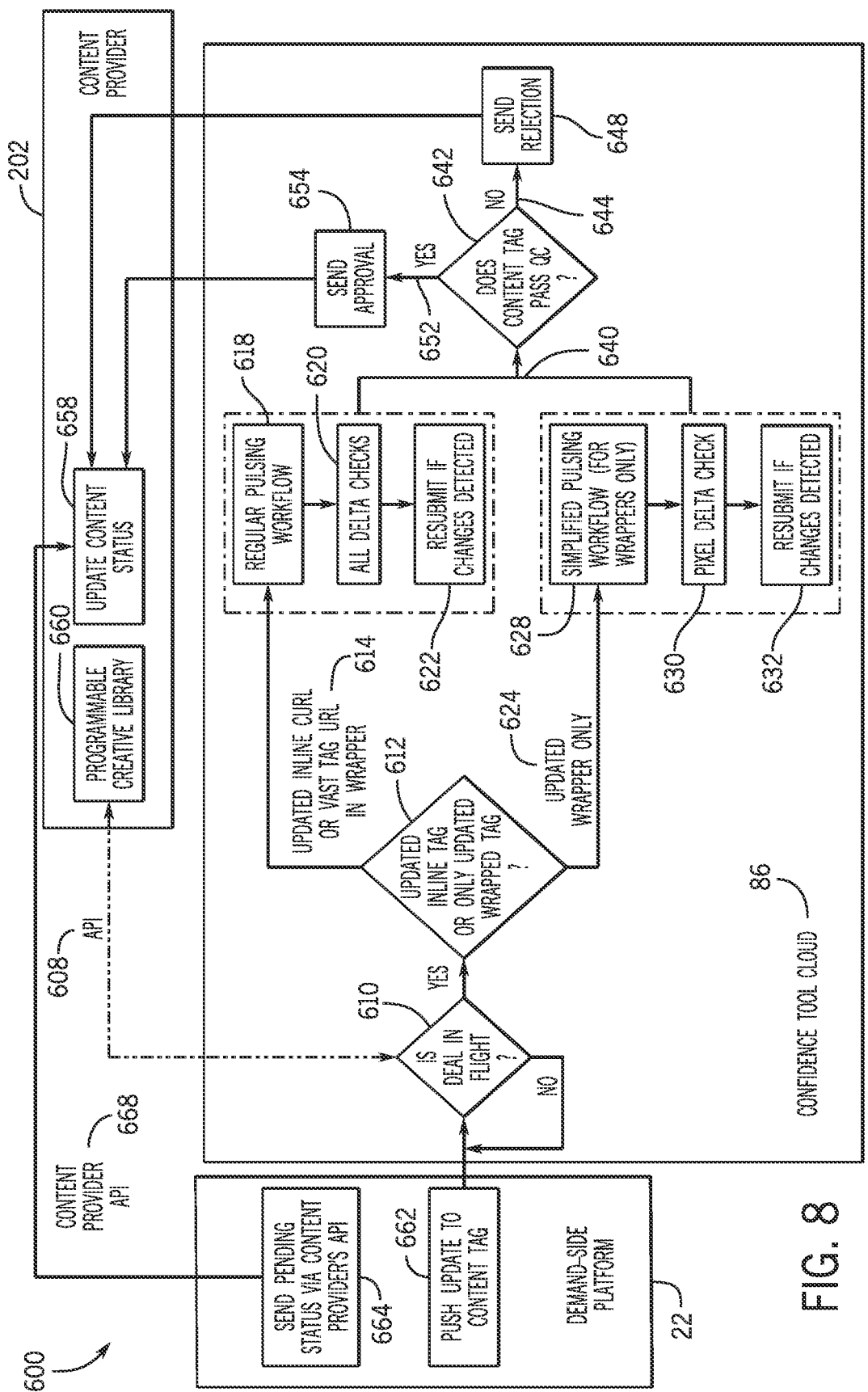
FIG. 8 is a flowchart of a pulsing system of the content deactivation system of FIG. 7, in accordance with an embodiment of the present disclosure.

FIG. 8 is a flowchart of a pulsing system 600. In some embodiments, the pulsing system 600 may be a detailed view of the pulsing 526 operation in FIG. 7 above. The pulsing system 600 may include the DSP 22, the content provider 202, and the confidence tool cloud 86. In block 662, the DSP 22 may push an update to a content tag that has already undergone the QC process discussed in FIGS. 2 and 3. In block 664, once the DSP 22 updates the content tag, it may notify the content provider 202 of the content's pending status via the content provider's API (as indicated by arrow 668). The confidence tool cloud 86 may, in decision block 610, determine if content is in flight (i.e., scheduled to go live but not yet live). The confidence tool cloud may communicate with the programmable content library 660, via an API 608 of the content provider 202, to obtain information regarding programmatic deals, and use this information to determine if the deal is in flight. If the confidence tool cloud 86 determines that the deal is not in flight and/or not scheduled to be in flight, the confidence tool cloud 86 may refrain from taking action regarding the deal, and may continue to periodically check if the deal is in flight. Additionally or alternatively, if the confidence tool cloud 86 determines that the deal is not in flight, the confidence tool cloud 86 may check to see if the deal is scheduled to be in flight (e.g., may be set to in flight at a later time or a later date). If the confidence tool cloud 86 determines that the deal is in flight or is scheduled to be in flight, this may indicate that the content has previously undergone and passed the QC process of the programmatic QC system 200. If the decision block 610 returns a "yes," the confidence tool cloud 86 may, in decision block 612, determine whether the content has an updated inline tag 474 (e.g., an updated client uniform resource locator (cURL) of the inline tag 474) or only an updated wrapped tag 458 (e.g., only the URL of the wrapped tag 458 has been updated). If the confidence tool cloud 86 determines that the content has an updated wrapped tag 458, the confidence tool 86 may also determine if the updated wrapped tag 458 has an associated inline tag 474 that has been updated as well (e.g., by checking the VAST ad tag URI of the wrapped tag 458).

If the confidence tool cloud 86 determines that the content has an updated inline tag 474, the confidence tool cloud 86 may push the content to a regular pulsing workflow 618, as indicated by arrow 614. In block 620, the regular pulsing workflow 618 may perform a delta check on certain relevant attributes (e.g., bit rate, pixel size, duration, resolution, and so forth) of the inline tag 474, the wrapped tag 458 wrapped around the inline tag 474, and the content hosted by the inline tag 474 to determine if any changes have occurred since the prior QC was performed. Delta checks, unlike the QC checks discussed previously, are only checking to determine if changes have been made to the wrapped tag, inline tag, and/or content, rather than actually performing QC on the relevant attributes wrapped tag, inline tag, and/or content. If any changes were identified during the delta checks in block 620 of the regular pulsing workflow 618, in block 622, the content may be resubmitted for QC (e.g., may be resubmitted to the programmatic QC system 200 in FIG. 2).

If the confidence tool cloud 86 determines that only the wrapped tag 458 has been updated, the confidence tool cloud 86 may push the content to a simplified pulsing workflow 628. The simplified pulsing workflow 628 may, in block 630, run pixel delta checks on the wrapper only. The confidence tool cloud may utilize the simplified pulsing workflow because the wrapped tag 458, unlike the inline tag 474, does not indicate or host the programmatic content. Thus if changes are made to the inline tag 474, the content itself may have been changed. But if changes are made only to the wrapped tag 458, the content may have experienced no change, and thus a full delta check on all attributes of the content is not necessary. If the confidence tool cloud 86 determines, via the delta checks in block 630, that one or more changes were detected by the simplified pulsing workflow 628, the confidence tool may, in block 632 resubmit the content for QC. If while running either the regular pulsing workflow 618 or the simplified pulsing workflow 628, the confidence tool cloud 86 does not detect a change in the content tag or content, the confidence tool cloud 86 may take no further action on the content. If the confidence tool cloud 86 detects a change in the content tag while performing either the regular pulsing workflow 618 or the simplified pulsing workflow 628, the confidence tool cloud may resubmit the content for QC, as indicated by arrow 640.

At decision block 642, the confidence tool may determine, after running QC on the updated content tags, whether the updated content tags pass the QC check. If the content does not pass the QC check, as indicated by arrow 644, the confidence tool cloud 86 may, at process 648 send, to the content provider 202, an indication that the content did not pass QC check. If the content does passes the QC check, as indicated by the arrow 652, the confidence tool cloud 86 may, at process 654 send, to the content provider 202, an indication that the content passed the QC check. In block 658, the content provider 202 may update the content status in the content provider 202 to Approved if the content passed the QC check or Rejected if the content failed the QC check.

Figure 9:
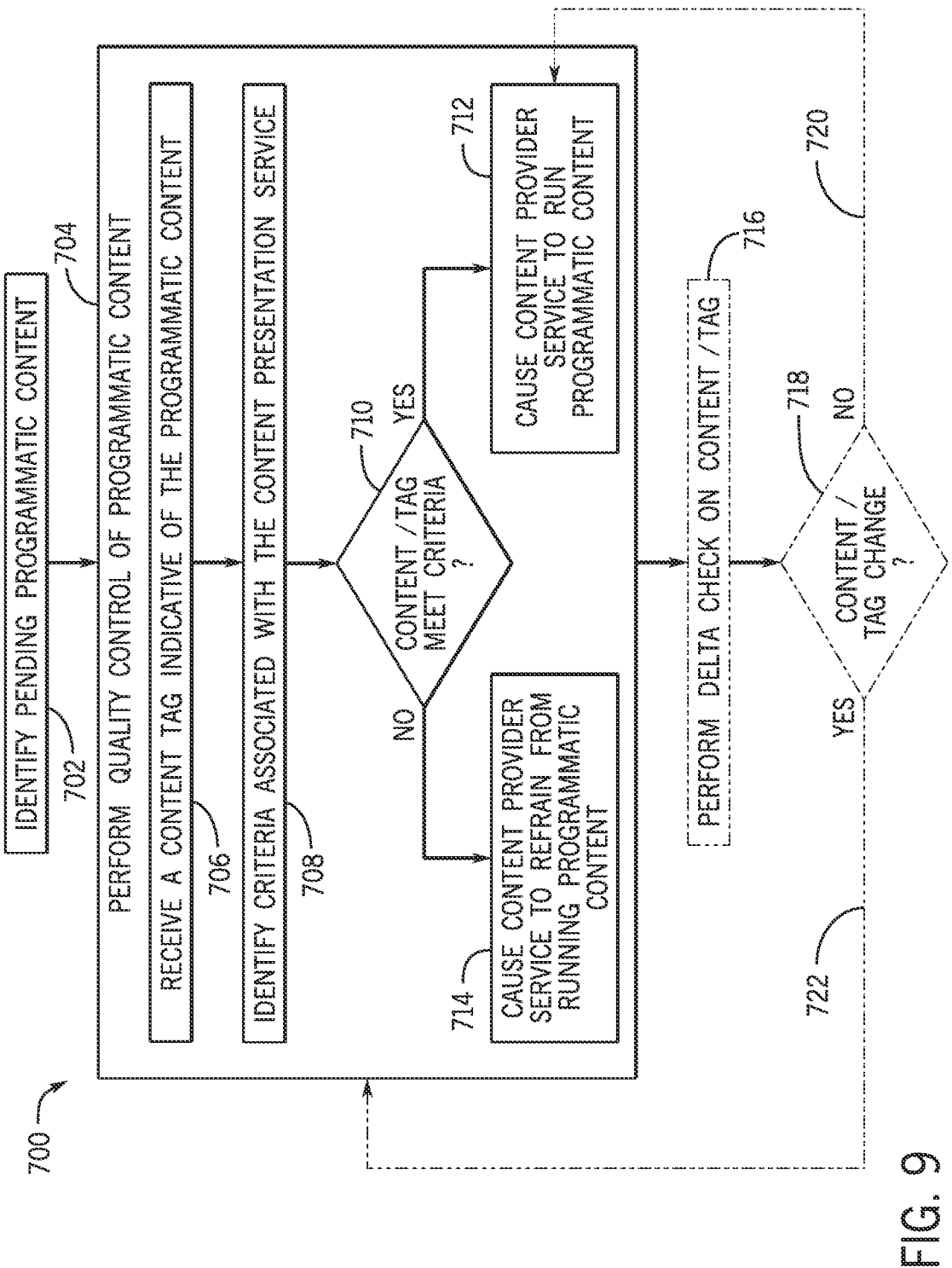
FIG. 9 is a flowchart illustrating a high-level view of the programmatic quality control system of FIG. 2 and the pulsing system of FIG. 8, in accordance with an embodiment of the present disclosure.

FIG. 9 illustrates a high-level flowchart of a programmatic quality control process 700, such as the programmatic quality control processes described above. In process block 702, a programmatic quality control system (e.g., the programmatic QC system 200, particularly the confidence tool 204) may identify pending programmatic content. Once pending programmatic content has been identified, in process block 704, quality control of the pending programmatic content may be performed. In process block 706, the programmatic quality control system may receive a content tag indicative of the programmatic content. In process block 708, the programmatic quality control system may identify criteria associated with a content presentation service (e.g., the content presentation service 512). The programmatic quality control system may then determine whether the content tag and/or the associated content meet the criteria identified in process block 708. If the programmatic quality control system determines that the programmatic content and/or content tag meet the criteria, the programmatic quality control system may cause a content provider (e.g., the content provider 202) to run the programmatic content. In certain embodiments, the programmatic content may already be in flight, and upon determining that the content and/or content tag meet the criteria, the programmatic quality control system may allow the content provider to run the programmatic content. However, if the programmatic quality control system determines that the content and/or content tag do not meet the criteria, the programmatic quality control system may cause the content provider service to refrain from running the programmatic content. After the quality control of process block 704 has been completed, in process block 716, a delta check may be performed on the programmatic content and/or content tag. As previously stated, the delta check may only determine (e.g., in decision block 718) whether any changes have been made to the programmatic content and/or content tag. If it is determined that no changes have been made to the programmatic content and/or content tag, then the programmatic quality control system may, as indicated by arrow 720, cause the content provider service to run the programmatic content, as is shown in process block 712. However, if it is determined that changes have been made to the programmatic content and/or content tag, the programmatic quality control system may, as indicated by arrow 722, again perform quality control on the programmatic content, as shown in process block 704.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

What is claimed is:

1. A tangible, non-transitory, computer-readable medium, comprising computer-readable instructions that, when executed by one or more processors of an electronic device, cause the electronic device to:
   identify programmatic content stored in a programmatic content library, wherein the programmatic content comprises content that is scheduled, at a content provider service, via an automated scheduling process, for presentation via a content presentation service; and
   in response to identifying the programmatic content, perform quality control of the programmatic content, by:
      receiving a content tag, indicative of the programmatic content, wherein the content tag comprises a link to the programmatic content;
      identifying criteria of the content presentation service;
      determining whether the content tag, the programmatic content, or both, meet the criteria of the content presentation service by analyzing the content tag, the programmatic content, or both;
      when the content tag, the programmatic content, or both does not meet the criteria of the content presentation service, causing the content provider service to refrain from running the programmatic content; and
      when the content tag, the programmatic content, or both meets the criteria of the content presentation service;
         causing the content provider service to run the programmatic content; and
         periodically performing, while the content tag, the programmatic content, or both continue to meet the criteria of the content presentation service, a delta check on the content tag, the programmatic content, or both, wherein performing the delta check comprises determining whether the content tag, the programmatic content, or both have undergone a change since passing the quality control that could cause the content tag, the programmatic content, or both to fail to meet the criteria of the content presentation service; and
         in response to determining that the change has occurred, performing a second round of the quality control based upon the change.

2. The tangible, non-transitory, computer-readable medium of claim 1, comprising computer-readable instructions that, when executed by the one or more processors, cause the electronic device to:

identify the programmatic content by requesting the programmatic content, via an application programming interface (API) of the content provider service.

3. The tangible, non-transitory, computer-readable medium of claim 2, comprising computer-readable instructions that, when executed by the one or more processors, cause the electronic device to:
identify the programmatic content by requesting programmatic content associated with deals having a particular deal identifier, via an application programming interface (API) of the content provider service.

4. The tangible, non-transitory, computer-readable medium of claim 2, comprising computer-readable instructions that, when executed by the one or more processors, cause the electronic device to:
identify the programmatic content by requesting programmatic content associated with deals having a particular deal type, via an application programming interface (API) of the content provider service.

5. The tangible, non-transitory, computer-readable medium of claim 4, wherein the particular deal type comprises a programmatic guaranteed deal type.

6. The tangible, non-transitory, computer-readable medium of claim 2, comprising computer-readable instructions that, when executed by the one or more processors, cause the electronic device to:
identify the programmatic content by requesting programmatic content that is in a pending state, not yet being run.

7. The tangible, non-transitory, computer-readable medium of claim 1, wherein the programmatic content is defined based upon a deal generated in a demand side platform wherein the deal is generated in near-real-time with respect to performing the quality control.

8. The tangible, non-transitory, computer-readable medium of claim 1, comprising computer-readable instructions that, when executed by the one or more processors, cause the electronic device to:
in response to identifying the programmatic content, identify deals associated with the programmatic content;
filter from the deals any of the deals not meeting a deal criteria indicative of deals to be quality controlled; and
filtering from the programmatic content any programmatic content not associated with the filtered deals.

9. The tangible, non-transitory, computer-readable medium of claim 1, comprising computer-readable instructions that, when executed by the one or more processors, cause the electronic device to:
cause the content provider service to run the programmatic content, by sending an indication that the programmatic content has been approved to the content provider service.

10. The tangible, non-transitory, computer-readable medium of claim 1, comprising computer-readable instructions that, when executed by the one or more processors, cause the electronic device to:
cause the content provider service to refrain from running the programmatic content, by sending an indication that the programmatic content has been rejected to the content provider service.

11. The tangible, non-transitory, computer-readable medium of claim 1, comprising computer-readable instructions that, when executed by the one or more processors, cause the electronic device to:
determine that the content tag comprises a wrapped tag comprising an indirect link to the programmatic content;
perform an unwrapping of the wrapped tag, in response to determining that the content tag comprises a wrapped tag, by:
performing quality control on the wrapped tag; and
navigating to the indirect link; and
continuing to perform the unwrapping until a direct link to the programmatic content is found.

12. The tangible, non-transitory, computer-readable medium of claim 11, comprising computer-readable instructions that, when executed by the one or more processors, cause the electronic device to:
in response to performing quality control on the wrapped tag, determine whether the wrapped tag has passed the quality control;
in response to determining that the wrapped tag has passed the quality control, perform the delta check on the wrapped tag, wherein performing the delta check comprises determining whether the wrapped tag has undergone a change since passing the quality control; and
in response to determining that the wrapped tag has changed since passing the quality control, re-performing the quality control on the wrapped tag.

13. The tangible, non-transitory, computer-readable medium of claim 12, wherein performing the delta check comprises performing the delta check on one or more pixels associated with the wrapped tag.

14. The tangible, non-transitory, computer-readable medium of claim 1, comprising computer-readable instructions that, when executed by the one or more processors, cause the electronic device to:
determine that the content tag comprises an inline tag comprising a direct link to the programmatic content; and
performing quality control on the inline tag and/or the programmatic content.

15. The tangible, non-transitory, computer-readable medium of claim 14, comprising computer-readable instructions that, when executed by the one or more processors, cause the electronic device to:
in response to performing quality control on the inline tag and the programmatic content, determine whether the inline tag and the programmatic content have passed the quality control;
in response to determining that the inline tag and the programmatic content have passed the quality control, perform the delta check on the inline tag and programmatic content, wherein performing the delta check comprises determining whether the inline tag and/or the programmatic content have undergone a change since passing the quality control; and
in response to determining that the inline tag and the programmatic content have changed since passing the quality control, re-performing the quality control on the inline tag and the programmatic content.

16. The tangible, non-transitory, computer-readable medium of claim 15, wherein performing the delta check comprises performing the delta check on attributes associated with the inline tag and/or the programmatic content, including performing the delta check to identify a change in pixel size, bitrate, duration, resolution, or any combination thereof.

17. A method, comprising:
identify programmatic content stored in a programmatic content library, wherein the programmatic content comprises content that is scheduled, at a content provider service, via an automated scheduling process, for presentation via a content presentation service; and
in response to identifying the programmatic content, perform quality control of the programmatic content, by:
receiving a content tag, indicative of the programmatic content, wherein the content tag comprises a link to the programmatic content;
identifying criteria of the content presentation service;
determining whether the content tag, the programmatic content, or both meet the criteria by analyzing the content tag;
in response to determining that the content tag, the programmatic content, or both meet the criteria of the content presentation service, causing the content provider service to run the programmatic content and periodically performing, while the content tag, the programmatic content, or both continue to meet the criteria of the content presentation service, a delta check on the content tag, the programmatic content, or both, wherein performing the delta check comprises determining whether the content tag, the programmatic content, or both have undergone a change since passing the quality control that could cause the content tag, the programmatic content, or both to fail to meet the criteria of the content presentation service; and
in response to determining that the change has occurred, performing a second round of the quality control based upon the change and
in response to determining that the content tag, the programmatic content, or both do not meet the criteria of the content presentation service, causing the content provider service to refrain from running the programmatic content.

18. The method of claim 17, comprising:
iteratively performing the quality control of the programmatic content at a periodic interval.

19. The method of claim 17, comprising:
identifying the content tag as a wrapped tag;
iteratively, until an inline tag is identified in an unwrapped tag:
performing a quality control of the content tag without performing quality control of the programmatic content; and
unwrap the wrapped tag; and
in response to identifying an inline tag in an unwrapped tag, performing quality control of the programmatic content and the unwrapped tag where the inline tag was identified.

20. The method of claim 19, comprising:
identifying one or more changes made to the inline tag; and
in response to identifying the one or more change made to the inline tag, re-perform the quality control of the programmatic content.

21. A tangible, non-transitory, computer-readable medium, comprising computer-readable instructions that, when executed by one or more processors of an electronic device, cause the electronic device to:
identify programmatic content stored in a programmatic content library, wherein the programmatic content comprises content that is scheduled, at a content provider service, via an automated scheduling process, for presentation via a content presentation service; and
in response to identifying the programmatic content, perform quality control of the programmatic content, by:
receiving a content tag, indicative of the programmatic content, wherein the content tag comprises a link to the programmatic content;
identifying the content tag as a wrapped tag;
iteratively, until an inline tag is identified in an unwrapped tag:
performing a quality control of the content tag without performing quality control of the programmatic content; and
unwrap the tag;
in response to identifying an inline tag in an unwrapped tag, performing quality control of the programmatic content and the wrapped tag where the inline tag was identified;
identifying criteria associated with the content presentation service;
determining whether the content tag, the programmatic content, or both, meet the criteria by analyzing the inline tag;
in response to determining that the content tag, the programmatic content, or both meets the criteria, causing the content provider service to run the programmatic content; and
in response to determining that the content tag, the programmatic content, or both does not meet the criteria, causing the content provider service to refrain from running the programmatic content.

* * * * *